Feb. 12, 1946.        G. H. PURCELL        2,394,563
ALTITUDE CORRECTION COMPUTER
Filed May 11, 1943
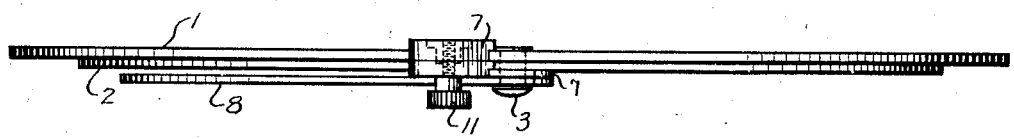
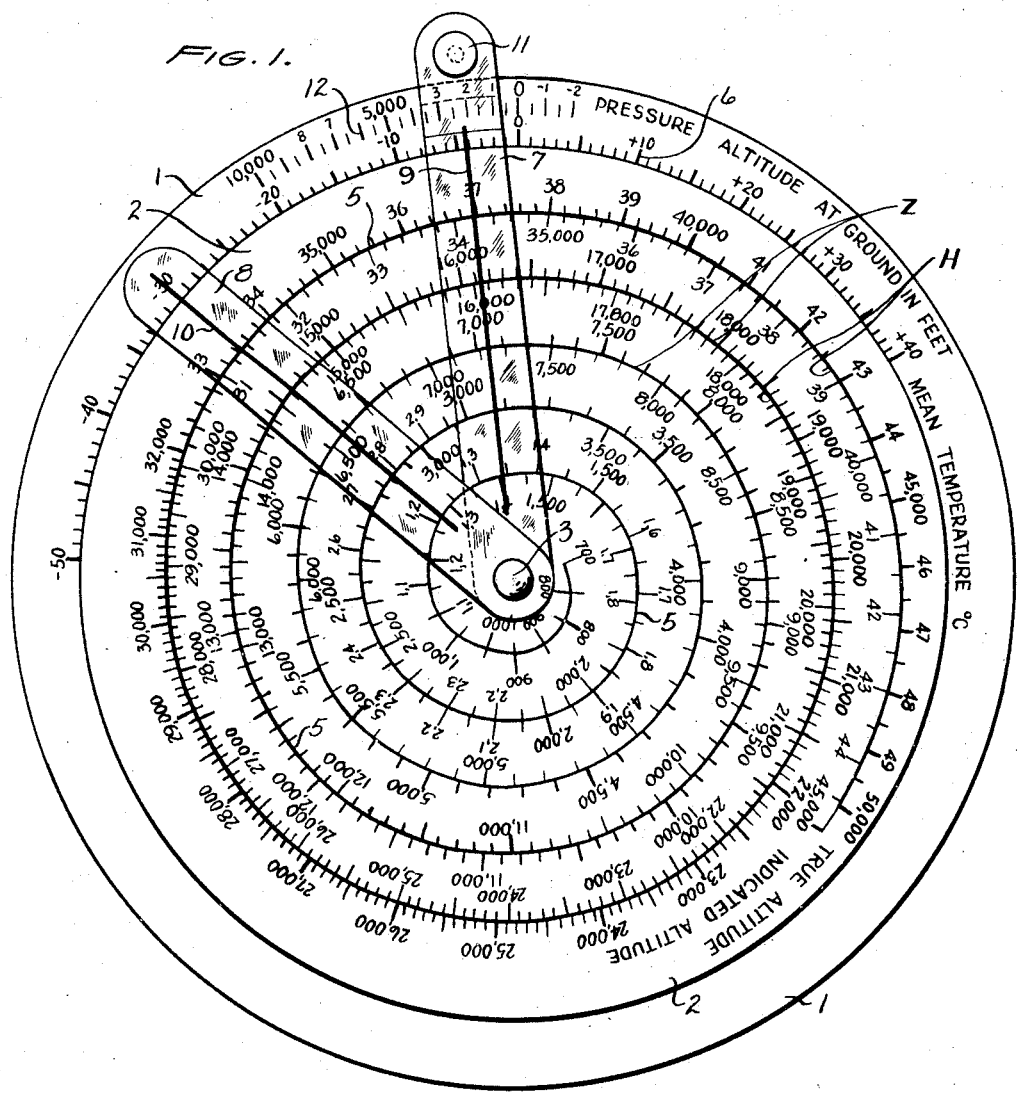

Patented Feb. 12, 1946

2,394,563

UNITED STATES PATENT OFFICE 2,394,563

ALTITUDE CORRECTION COMPUTER

George H. Purcell, Dayton, Ohio

Application May 11, 1943, Serial No. 486,499
4 Claims. (Cl. 235—84)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in aeronautical instruments, and more particularly to computers designed to compute the true altitude from the indicated altitude of aircraft altimeters for existing variations in atmospheric conditions differing from the standard atmospheric conditions for which the altimeter may be calibrated.

In present practice, the altitude of the aircraft in flight is indicated by an aneroid barometer calibrated in feet, taking into consideration a predetermined standard variation in temperature relative to altitude. This instrument is actuated solely by the pressure of the air at the level in which the aircraft is operating. However, in order to determine the true altitude of the aircraft, the pressure of the air at the ground, and the average temperature of the air between the ground and the aircraft must also be considered, since the standard atmospheric conditions for which the altimeter is calibrated seldom, if ever, occur in practice.

These variations between the indicated altitude of the standard altimeter and the true altitude are often considerable, and for certain applications, such as aerial photograph, bombing, etc., where true altitude is essential, some kind of a computer is usually employed, which can be manipulated or set, according to one or more of the actual existing variable conditions to derive a better approximation to the true altitude. An example of one of these computers is disclosed in Patent 1,918,188, dated July 11, 1933, issued to George P. Luckey.

In the computer disclosed in the Luckey patent, a rotatable disc is provided carrying a spiral double scale of altitudes, one of these scales, called the "Z" scale, indicating isothermal altitude, and laid out logarithmically with respect to angular degrees about the center of the disc, while the other scale, called the "H" scale, denotes the indicated altitude, and is also laid out on the same spiral, in such a manner that the standard altimeter indications are located on the H scale, and the isothermal altitude corresponding to the same pressure can be read at the same position of the Z scale. The disc is pivoted at its center, at the center of a second supporting disc of larger diameter, carrying two temperature scales, concentric to the pivotal center of both the discs. These temperature scales are located around a portion of, and outside of, the periphery of the smaller disc; one is a scale calibrated with respect to temperature at the ground, while the other is a scale calibrated with respect to the temperature aloft, or at the level at which the aircraft is operating. Two radial cursors are provided on the Luckey computer, pivoted at the center of both discs so as to be restrained to angular movement over the face of both discs.

In operation of the Luckey computer, the first cursor is set at the ground temperature as indicated on the appropriate scale on the outer disc, while the second cursor is set at the indicated temperature aloft, on the other temperature scale. The inner disc is then rotated with respect to the larger disc until the indicated altimeter reading on the aircraft, indicated on the H scale, is placed under the first cursor. The corrected altitude is then read under the second cursor on the Z scale.

When standard sea level pressure exists at the ground, reasonably accurate calculations can be made with the Luckey computer, but since the actual ground level or sea level atmospheric pressure varies over a considerable range from time to time, hardly remaining the same for any great length of time due to normal atmospheric changes, changes in sea level pressure, and in average ground level pressures due to altitude of the ground level above sea level, the Luckey computer cannot indicate true altitude unless standard sea level pressure exists at the ground. This conditions occurs very infrequently.

My computer is an important improvement on the disclosure, as set forth in the above-referred-to Luckey Patent, 1,918,188, which may be referred to for the general construction, arrangement and computation of the spiral dual altitude scales.

An object of my invention, therefore, is to provide an improved true altitude computing device, calculated to take into consideration variations in air pressure at ground level, as well as variations in the average temperature of the air column between the ground and the airplane.

A further object is the provision of a true altitude computing device calibrated to indicate relative indicated and true altitudes with respect to the air pressure at the ground, together with means on the calculator for cooperating with the true and indicated altitude calibrations for indicating predetermined variations therebetween, due to variations in atmospheric pressure conditions at the ground, as well as mean temperature variations.

A still further object is the provision of a true altitude computing device, calibrated to indicated relative variations between the true altitudes and indicated altitudes at predetermined uniform atmospheric pressure and temperature variations between the ground and the indicated altitudes, together with cooperating shiftable means for varying the indicated relation between the indicated altitudes and corresponding true altitudes in a predetermined relation to mean temperature variations between the ground and altitude, and with respect to variations in the atmospheric pressure at the ground.

More specific objects and advantages of the invention will be in part hereinafter pointed out, and otherwise become apparent from a consideration of the detailed description, taken in connection with the accompanying drawing showing an operative embodiment of my invention.

Referring to the drawing:

Fig. 1 is a plan view of my improved computer, and

Fig. 2 is a side view thereof.

Before describing the specific details of an instrument constructed in accordance with the invention, the mathematical development of its principle of operation will be discussed.

As has been stated, altimeters in current use are calibrated to a standard which assumes a uniform decrease of temperature with altitude. The assumption is made that the temperature at any altitude is given by the equation $$t = 15 - 0.001981 H$$

where $t$ is the temperature in degrees centigrade and $H$ is the height in feet. At any pressure $P$ given in millimeters of mercury, the altitude indicated by the altimeter is given by the formula $$P = 760 \left(1 - \frac{0.001981 H}{288}\right) 5.256$$

For this same pressure, if it is assumed that the temperature of the air column is 0° C., the altitude $Z$ is expressed by the formula $$Z = 60374.44 \log \frac{760}{P}$$

where $Z$ is the isothermal altitude in feet.

For example at a height of 10,000 feet in the standard atmosphere, the temperature is —4.81 degrees centigrade.

Standard (pressure) altitude is the altitude in feet, or other linear units, at which a given pressure would exist in the standard atmosphere. In other words, it is the indication of an altimeter calibrated perfectly to give true altitude in the standard atmosphere. For an example, a pressure of 19.03 inches of mercury might exist at a true height of 11,000 feet. This is however a pressure altitude of 12,000 feet.

If the pressure altitude at the ground and at the airplane, and the average temperature are known, the true altitude can be computed by the following formula $$(H_2 - H_1) = (Z_2 - Z_1) \frac{T_{m(1,2)}}{T_{s(1,2)}} \quad (1)$$

where $H_1$ = True altitude of the ground above some reference level, say sea level $H_2$ = True altitude of the airplane above the same reference level $Z_2$ = Standard pressure altitude at the airplane $Z_1$ = Standard pressure altitude at the ground $T_{m(1,2)}$ = Mean temperature between $Z_1$ and $Z_2$ in degrees absolute $T_{s(1,2)}$ = Standard mean temperature between $Z_1$ and $Z_2$ in degrees absolute If $H_1 = Z_1 = 0$ then the equation reduces to $$H_2 = Z_2 \frac{T_m}{T_{s(0,2)}} \quad (2)$$

where $T_{s(0,2)}$ = the standard mean temperature between $Z_0$ and $Z_2$. The standard mean temperature referred to is the average of temperatures taken at equal increments of altitude between any two altitudes in a standard atmosphere.

The Luckey computer is based on this equation, and performs this computation as follows:

When a cursor on the computer is set on a value on the indicated altitude scale, it is automatically set on a value on the true altitude scale which would be the true altitude, if there existed a constant, that is an isothermal temperature of 273° Kelvin (0° centigrade) throughout the vertical distance between the position of standard sea level pressure and the position at which the altimeter indication was taken.

Isothermal altitude, as used herein, means the indication of an altimeter calibrated perfectly to give the true altitude when used in an atmosphere of constant uniform temperature. The actual constant temperature chosen for the computation is 273° Kelvin (0° centigrade). It is the value $$\left(Z_2 \frac{273}{T_{s(1,2)}}\right)$$

When one of the cursors is set on the appropriate scale, at the temperature at the ground and the other cursor set at the temperature aloft, the angular separation is such that the value on the true altitude scale under the one cursor is multiplied by $$\frac{T_{m(1,2)}}{273}$$

when read on the true altitude scale under the other cursor. The value obtained is then $$Z_2 \frac{273}{T_{s(1,2)}} \times \frac{T_{m(1,2)}}{273} = Z_2 \frac{T_{m(1,2)}}{T_{s(1,2)}}$$

My improved computer is designed on the basis of a special mathematical development of equation $$H_2 - H_1 = (Z_2 - Z_1) \frac{T_{m(1,2)}}{T_{s(1,2)}}$$

The purpose of this mathematical development is to put the equation into such a form that it will be adaptable to a computer.

It is possible to rewrite this equation as follows $$(H_2 - H_1) = (Z_2 - Z_1) \frac{T_{m(1,2)}}{T_{s(0,2-1)} - aZ_1}$$

where $T_{s(0,2-1)}$ is the standard mean temperature between standard sea level and the value of pressure altitude $$Z' = (Z_2 - Z_1)$$

and $a$ is the constant .001981, the standard temperature lapse rate with altitude.

This brings the value $(Z_2 - Z_1)$, and the first term in the denominator of the temperature ratio, into the relation existing in the standard atmosphere. No simple way is known of making a correction on a computer for the second term of the denominator, $(-aZ_1)$, when the equation is in this form. However, if an approximation is made, the equation is put into a form well adapted to a computer. This approximation is the setting of $$\frac{T_m}{T_{s(0,2-1)}-aZ_1} \text{ equal to } \frac{T_m+aZ_1}{T_{s(0,2-1)}}$$

that is, $$H_2-H_1=(Z_2-Z_1)\frac{T_m}{T_{s(0,2-1)}-aZ_1}=(Z_2-Z_1)\frac{T_m+aZ_1}{T_{s(0,2-1)}}$$

The errors due to this approximation are too small to be objectionable for any atmospheric conditions actually occurring in service use.

My improved computer performs the following operations:

1. When the quantity $(Z_2-Z_1)$ on the indicated altitude scale is brought under the one cursor the value $$(Z_2-Z_1)\frac{273}{T_{s(0,2-1)}}$$

is automatically set on the true altitude scale.

2. If the said cursor was first set on 0° C. on the temperature scale and the second cursor is now set on the temperature $(T_m+aZ_1)$, the true altitude above the ground can be read on the true altitude scale in registration with the second cursor.

This separation of the cursors performs multiplication by $$\frac{T_m+aZ_1}{273}$$

Therefore, the result is $$(Z_2-Z_1)\frac{273}{T_{s(0,2-1)}} \times \frac{T_{m(1,2)}+aZ_1}{273}$$

or $$(Z_2-Z_1)\frac{T_{m(1,2)}+aZ_1}{T_{s(0,2-1)}}$$

the desired result.

In order to avoid the necessity of obtaining the product $aZ_1$ and adding it to the average temperature, the outer "Pressure altitude at the ground" scale on the computer is provided. When the long cursor arm is clamped at the pressure altitude at the ground, the value $aZ_1$ is effectively added to the average temperature.

The data required to make true altitude computations are:

1. Standard pressure altitude at the ground, $(Z_1)$.
2. Standard pressure altitude at the plane, $(Z_2)$.
3. Average temperature between the plane and the ground.
4. The difference, $(Z_2-Z_1)$.

Several types of computers can be designed for using the principles brought forth above. However, for purposes of illustration, a circular computer, such as that disclosed in the accompanying drawing, is utilized.

The numerals 1 and 2 designate two concentric members which are adjustable relative to a pivot 3 of any suitable construction. It has been found expedient to make the members 1 and 2 in the form of flat circular plates, the former being larger in diameter than the latter.

A double scale of altitudes in the form of a spiral 5 is delineated upon the exposed face of member 2. No exact geometrical form is required for this spiral. The degree of readability required of the instrument will determine the size of the numerals and graduations, and therefore will determine the radial distance apart of the successive turns in the spiral. Along this curve the scale of isothermal altitude is laid out logarithmically with respect to degrees around a point of origin of the curve. Any radial line will be suitable as a reference line from which the angular distances may be measured. This isothermal scale must be laid out before any of the other three scales on the computer, and is required only to be logarithmic with respect to the positions in angular degrees, i. e.

$$d=K \log Z$$

where $d$ is the position of the graduation in angular degrees from any arbitrary zero position, $Z$ is the true isothermal altitude and $K$ is any constant. This constant can have any arbitrary value and will, in practice, be determined by the size and readability of the computer to be constructed. When this "K" is selected and the zero position on the scale is selected, all graduations on this scale, and on the other three scales are determined by mathematical relationships among the scales. The scale of indicated altitude is also laid out along the same curve 5 coextensive with the scale of isothermal altitude in such manner that values of the isothermal or true altitudes and indicated altitude pressures are adjacent. The true altitude scale is called the Z scale and the indicated altitude scale is called the H scale. Indicated altitudes, as stated above, are altitudes taken from a standard altimeter. The latter is calibrated according to the United States standard atmosphere as described in N. A. C. A. Report No. 538. For example, if the isothermal temperature is taken at 0° C. (273° Absolute) as is done on applicant's illustrated computer, the relationship between adjacent corresponding graduations on the dual scale is $$H=\frac{T_m}{273}Z$$

where $T_m$ is the mean temperature in the standard atmosphere for the altimeter indication H. These two scales are used to obtain the isothermal altitude value of the pressure corresponding to the pressure actuating the altimeter. The altitude as indicated by the altimeter instrument is read off on the H scale and the number on the Z scale represents the isothermal altitude corresponding to the pressure at the indicated altitude. Thus, if H is equal to 10,000 feet, Z is equal to 9,821 feet.

In the illustrative embodiment of the invention, the low altitudes are placed in the center of the spiral. This aids in obtaining a constant error throughout the range as the higher altitude readings, which are cramped because of the logarithmic scale, are opened out because of the greater linear distance subtended by one degree on the outer portion of the scale. A small sized computer can be made, yet the scale can be made long enough to read the true altitude within the accuracy of the computer.

A scale of mean temperatures 6 is delineated on the front face of member 1 and extends circumferentially with respect to member 2. This scale is calibrated in degrees centigrade, for the purpose of illustration, and is laid off logarithmically in absolute temperature with respect to angular degrees. The logarithmic relationship between this absolute temperature scale and angular degrees is the same as the relationship between the true altitude scale and angular degrees. If $d=K \log Z$, is the equation used for the positioning of the graduations on the Z scale; then $$d=K \log t$$

must be used for scale 6, where $d$ is the position in angular degrees for placing the graduations for temperature *t* in degrees absolute. The coefficient K has the same numerical value in both equations. The zero degree position is arbitrary. Therefore, since the Z scale is based on an isothermal temperature of 273° absolute (0° centigrade) if an altitude on the Z scale is brought opposite 273° absolute, then the altitude corresponding to any other average temperature is given opposite that average temperature of scale 6.

Since it is necessary in the operation of the computer to bring points on the outer scales into radial alignment with points on the inner spiral scale, it is desirable to provide means for aiding the eye in the registration of selected points on the altitude scale with points on the temperature scale. This may be accomplished by pivoting two cursor arms 7 and 8 concentric to the axis of member 2. These arms should traverse both the altitude and the temperature scales, and should have sighting lines 9 and 10 respectively extending precisely radial to pivot 3. For convenience in the operation of the computer, a long cursor arm 7 is provided with a suitable clamp 11 which may be tightened sufficiently to afford such frictional contact between the arm and member 1 that the arm will remain in adjusted position until forcibly moved. The arms may be constructed of any suitable transparent material, such as Celluloid, in order that the graduations on the scales may not be obscured.

The scale 12 is laid out on the member 1 concentrically with respect to the mean temperature scale 6. This scale is calibrated in pressure altitude at the ground in feet. The circumferential direction of increasing altitudes on this scale is opposite the direction of increasing temperatures on the temperature scale. The zero altitude graduations are located on the same radial line as the 0° C. temperature graduation. The angular spacing of these pressure altitude at the ground graduations is such that the separation of successive 1,000 foot graduations is the same as the spacing for a difference of 2° C. on the temperature scale when this 2° is measured at the same angular position on the scale as the pressure altitude. For example, the 10,000 foot graduation will fall on the same radial line as the —20° C.; the 5,000 foot graduation will fall on the same line as the —10° C., and the —2,000 foot graduation will fall on the same radial line as the plus 4° C.

Before going into the air, the pressure altitude in feet at the ground must be determined. This indication can be obtained from the usual altimeter since it is calibrated to indicate pressure altitude when the pressure scale is set at 29.92. The mean temperature is obtained by noting the indications of the temperature on a suitable thermometer at given elevations between the ground and the flight altitude, and obtaining a mean relation therefrom. The long cursor arm 7 is adjusted to the pressure altitude at the ground indication on the scale 12 and clamped in this position. Then, at any altitude indicated by the altimeter, and after the mean temperature has been determined, the arm 8 is positioned with its sighting line 10 registering with the indicated mean temperature on the scale 6. The indicated altitude obtained from the altimeter is now determined on the H scale of the rotatable disc member 2, and this indication is placed under the sighting line 9 of the long cursor arm 7. By observing the altitude indication on the Z scale directly under the sighting line 10 of the short cursor arm 8, the true altitude can be determined.

For example, should the pressure altitude in feet at the ground be observed as 2200 feet, the cursor arm 7 will be adjusted to the position as shown in the drawing, with the sighting line 9 registering at 2200 on the scale 12. By observing the temperature at the ground and the temperature readings at regular elevations on the way aloft, the mean temperature can be easily determined, in the usual way, and, as an example, if this mean temperature was —30°, the sighting line 10 of the short cursor arm 8 would be placed over this mean temperature indication.

Again assuming that the altitude as indicated by the altimeter is 16,050 feet, this altitude indication as observed on the H scale would be placed under the sighting line 9 of the long cursor arm 7, and the true altitude as indicated on the Z scale would be read directly under the sighting line 10 of the short cursor arm 8, namely, about 14,600, and thus, from the indicated altitude on the altimeter, and the data given, the computer affords means for accurately determining the distance between the aircraft and the ground.

Assuming that it is desired to bomb, or to take photographs at an elevation of 14,600 feet, and the pressure and temperature conditions were the same as indicated in the other example, this desired altitude, as observed on the Z scale, would be placed under the sighting line of the short cursor arm 8 and the plane flown at the altitude as indicated on the altimeter on the plane corresponding to the altitude (16,050) indication on the H scale lying under the sighting line 9 of the long cursor arm 7. Variations in the pressure altitude at the ground are accurately compensated for by the shifting of the long cursor arm to the indicia on the scale 12 calibrated to take care of the variations. These calculations cannot be made directly on the existing types of computers.

Having described my invention, what I claim as new, and desire to secure by Letters Patent, is:

1. In an altitude computing device, a member having an elongated dual scale thereon calibrated from end to end to denote predetermined indicated altitudes and corresponding true altitudes existing in a uniform standard mean temperature between the ground and the said indicated altitudes, the said true altitude scale being calibrated logarithmically from end to end, a second member movably carrying the first member having an elongated scale of mean temperature indications, corresponding to mean temperatures between the ground and aloft, and calibrated logarithmically in degrees between the ends of the scale with respect to said dual scale indications and said standard mean temperature to compensate for variations between the true and indicated altitudes on the dual scale due to variations between the standard mean temperature and the existing mean temperatures, said mean temperature scale being disposed on said second member for registration with the true altitude indications on the dual scale, a second elongated scale on said second member arranged adjacent said mean temperature scale, calibrated in units of ground pressure altitude, said ground pressure altitude scale graduations being positioned with respect to the true and indicated altitude indications on the dual scale and said mean temperature scale indications, to register with selected indicated altitude indications on the dual scale when predetermined true altitude indications are in registration with selected mean temperature indications on the mean temperature scale to compensate for variations between the indicated altitude and true altitude indications on the dual scale due to variations between the standard ground pressure altitude and the existing ground pressure altitude.

2. An altitude computing device comprising a pair of relatively rotatable disc-shaped members, one of said members having an arcuate scale thereon denoting variations in degrees in the mean temperature of the air encountered in flight with respect to a predetermined standard mean temperature, an arcuate ground pressure altitude scale disposed on the last member adjacent the mean temperature scale and calibrated to indicate variations in the ground pressure altitude relative to a predetermined standard ground pressure altitude, the other of said relatively rotatable members having a spiral dual scale thereon with its point of origin in the center of rotation of the member, denoting indicated and corresponding true altitude indications thereon, said true altitude scale being calibrated logarithmically from end to end with reference to the aforesaid predetermined standard mean temperature and standard ground pressure altitude, said mean temperature scale indications and said ground pressure altitude scale indications being calibrated logarithmically from end to end with reference to said dual scale indications to dispose the true altitude indications on the dual scale in radial alignment with the mean temperature indications indicating the actual mean temperature when said indicated altitude indicia is in radial alignment with the ground pressure altitude indication on the ground pressure altitude scale corresponding to the actual ground pressure altitude.

3. In an altitude computing device, an annular disc-shaped member having a spiral dual scale thereon with a point of origin at the center of the disc member and terminating adjacent the periphery of the member, said scale being calibrated from end to end to denote predetermined indicated altitudes and corresponding true altitudes existing in a uniform standard mean temperature between the ground and said indicated altitudes, and a standard ground pressure altitude, said true altitude scale being calibrated logarithmically from end to end, a second member rotatably carrying the first member with its center of relative rotation at the point of origin of the spiral dual scale and having an arcuate scale of mean temperature indications equidistant from the point of origin of the spiral dual scale and disposed for radial registration with the true altitude indications on the spiral dual scale, said mean temperature scale being calibrated logarithmically in degrees between its ends with respect to the dual scale indications and said standard mean temperature to compensate for variations between the true and indicated altitudes on the spiral dual scale due to variations between the standard mean temperature and the existing mean temperature, a second arcuate scale on said second member, equidistant throughout its length from the point of origin of the spiral dual scale, disposed adjacent said mean temperature scale and calibrated to indicate ground pressure altitudes varying with respect to said standard ground pressure altitude indications, being calibrated with respect to said true and indicated altitudes on the spiral dual scale and said mean temperature indications to radially register with said indicated altitude indications on the spiral dual scale when selected true altitude indications are in radial registration with selected mean temperature indications on the arcuate mean temperature scale, to compensate for variations between the indicated altitude and true altitude indications on the dual scale due to variations between the standard ground pressure altitude and the existing ground pressure altitude.

4. A true altitude computer of the class described comprising a pair of relatively rotatable circular members of different diameters, the larger of said members having an arcuate scale thereon disposed adjacent to and beyond the periphery of the smaller member denoting variations in degrees in the mean temperature of the air encountered in flight with respect to a predetermined standard mean temperature, and having a zero point from which the temperature indications extend in opposite directions, said larger member having a second arcuate scale thereon concentric with respect to the mean temperature scale and adjacent thereto beyond the periphery of the smaller member, having a zero point in radial registration with the zero point of the mean temperature scale and denoting variations in ground pressure altitudes, with respect to a standard ground pressure altitude, the smaller of said relatively rotatable circular members having a spiral dual scale thereon with a point of origin at the center of rotation of the member and terminating adjacent the periphery thereof, said spiral scale being calibrated from end to end to denote indicated altitudes and corresponding true altitudes existing in a uniform standard mean temperature between the ground and said indicated altitudes, and a standard ground pressure altitude, said true altitude scale being calibrated logarithmically from end to end, said mean temperature scale indications being disposed for radial registration with the true altitude indications on the spiral dual scale and calibrated logarithmically in degrees between its ends with respect to the dual scale and said standard mean temperature to compensate for variations between true and indicated altitudes on the spiral dual scale due to variations between the standard mean temperature and the existing mean temperature, said ground pressure altitude scale indications being calibrated with respect to said true and indicated altitudes on the spiral dual scale and said mean temperature indications to radially register with said predetermined indicated altitude indications on the spiral scale when true altitude indications are in radial registration with selected mean temperature indications on the arcuate mean temperature scale, to compensate for variations between the indicated and true altitude indications on the spiral dual scale due to variations between the standard ground pressure altitude and the existing ground pressure altitude.

GEORGE H. PURCELL.